Patented Nov. 30, 1926.

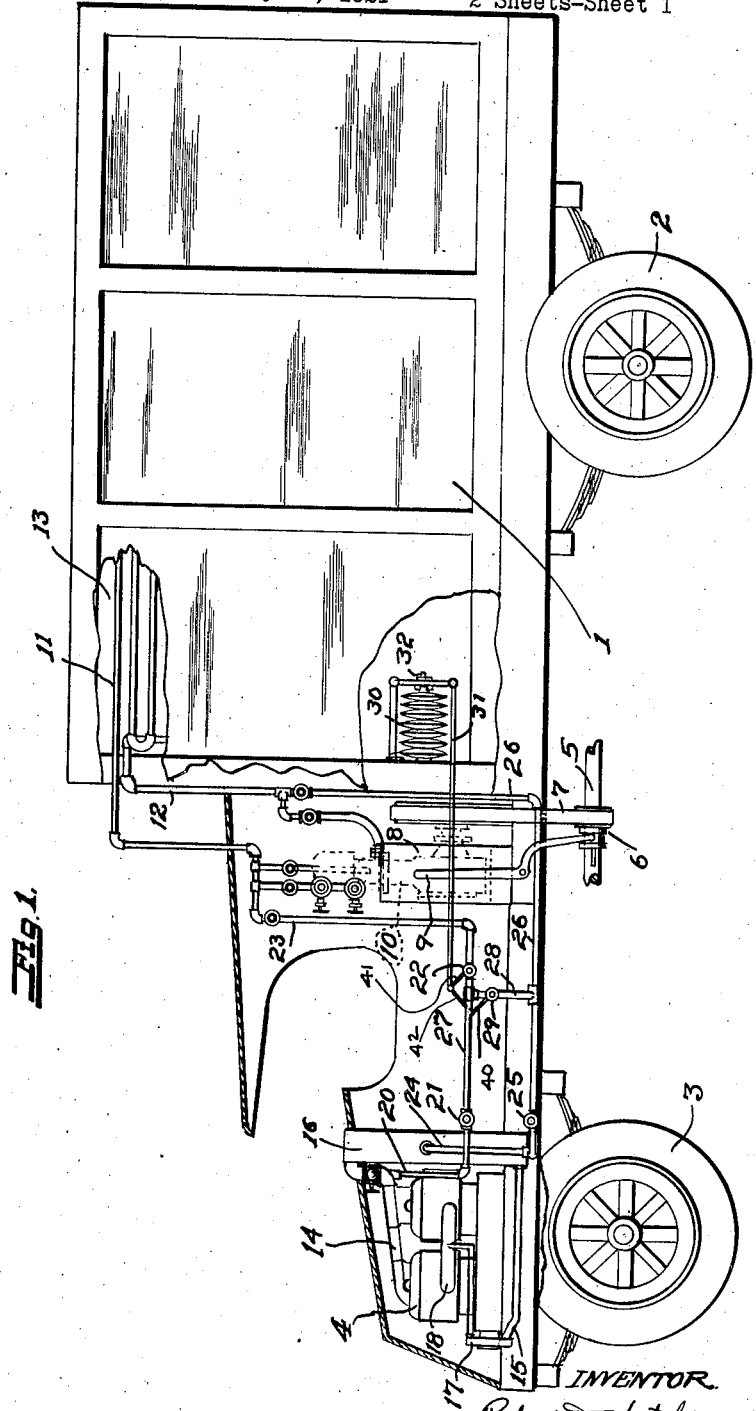

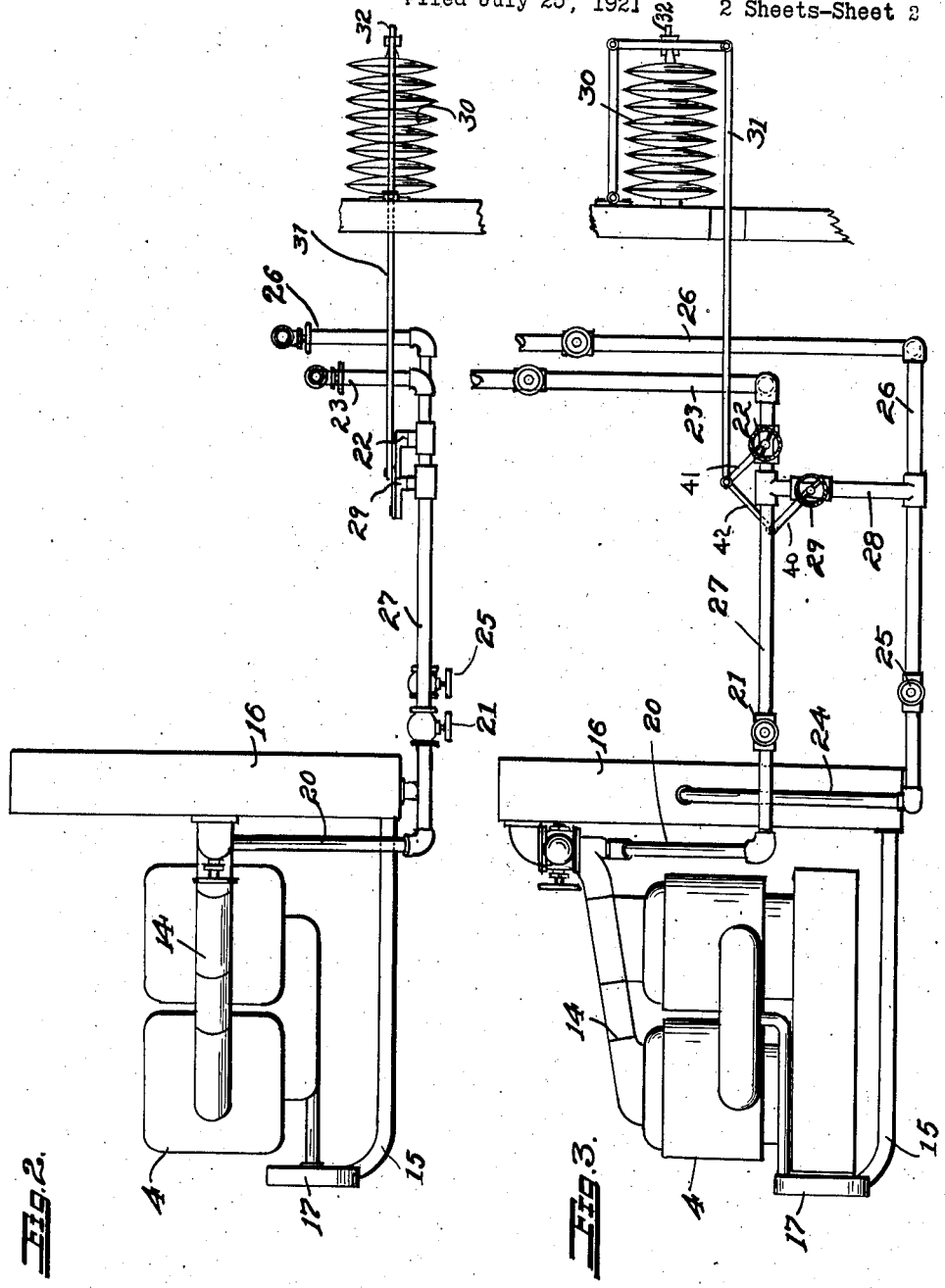

1,608,982

UNITED STATES PATENT OFFICE.

ROBERT D. HATCH, OF SAN FRANCISCO, CALIFORNIA, ASSIGNOR OF ONE-HALF TO LUTHER ELKINS, TRUSTEE.

CONSTANT-TEMPERATURE VEHICLE.

Application filed July 25, 1921. Serial No. 487,417.

My invention has for its object the attainment of comparatively constant temperature within the compartments of a vehicle adapted to the transporting of various articles, and is particularly applicable to the transportation of food products and other perishable articles.

I have heretofore set forth the details of the construction of a vehicle, having a refrigerator body adapted to handle food products and the like, and which is provided with refrigerating apparatus for retaining a low atmosphere within the body compartments and which apparatus is adapted to be driven by a motor adapted also to propel the vehicle, all of which is fully set forth in United States Letters Patent, No. 1,341,744, issued on June 4, 1920. My said refrigerator vehicle is particularly adapted to hot weather use, and to enable the vehicle to be equally useful during cold weather I have invented a certain additional combination therefor.

My present invention is therefore directed to further improvements in the said type of vehicle, whereby during periods of cold weather, the temperature within the body compartments of the vehicle may be raised to the desired degree to prevent the overchilling or cooling which would otherwise result in the deterioration of certain vegetables or other products.

My invention contemplates the embodiment of a closed compartment body on a motor driven vehicle, which compartment, of which there may be any number, is provided with cooling means, as coils of pipe in which a refrigerating fluid may be circulated during hot weather, and also motor apparatus for driving the said vehicle and the said refrigerating means, and in conjunction with which motor there is the usual cooling system. In my present invention I employ connections between such a motor and the said circulating system, such that the hot fluid from the motor may be diverted in any quantity required through the said circulating system, whereby the compartments are heated above the temperature of the surrounding atmosphere.

I prefer to control the quantity of warm diverted fluid by thermostat actuated means, so that the internal atmosphere of the compartment to which the thermostat is preferably exposed, will through the thermostat action be kept substantially at a predetermined temperature.

By referring to the accompanying drawings my invention will be made clear.

Figure 1 is a part section and part side view of a motor vehicle to which my invention has been applied.

Fig. 2 is a plan view and Fig. 3 is a side elevation of the motor and pipe connections, valves and thermostat of Fig. 1.

Throughout the figures similar numerals refer to identical parts.

The vehicle body is indicated by the numeral 1 mounted upon a chassis of the usual type and carried upon the wheels 2—3. A motor for driving the vehicle is shown at 4. A fragmentary portion of the transmission shaft from the motor to the rear axle as employed in well known types of motor vehicles and for conveying the power from the motor 4 to the wheels 2 is indicated at 5. A clutch is shown at 6 and a traveling belt at 7 to the compressor at 8. The clutch 6 may be thrown in or out at the will of the operator by the lever 9 so that the refrigerator or compressor 10 may be operated as desired to pass cooling fluid through the pipes of the circulating system 11—12, and thus vary the temperature within the compartments 13 of the body 1.

The engine 4 is provided with a cooling system of pipes 14—15 having the radiator 16 and the fluid pump 17 in series therebetween.

The cooling means ordinarily employed is a body of water, circulating through the pipes 14, radiator 16, return pipe 15, pump 17, and water manifold 18, whereby the surrounding walls in the interior of the motor 4 are kept at the desired temperature for efficient operation.

In my present invention I connect the cooling system of the motor with the circulating pipes 11 and 12 by means of the pipe 20, master valve 21, pipe length 27, butterfly valve 22, pipe length 23, with the inlet pipe of the circulating system 11 and I tap into the radiator or other suitable point in the said cooling system a return connecting pipe 24, master valve 25, pipe length 26, with the return end of the circulating system 12, and I prefer to cross connect the pipes 27 and 26 by the pipe 28, within which I also mount a second butterfly valve 29. These butterfly valves 22—29 are cross connected by levers 40, 41, and link 42, so that as 22 closes 29 opens, and vice versa, and I prefer also to provide within the compartments a thermostat mechanism 30 and connections 31 with the said butterfly valves, so that as the compartment 31 rises in temperature to the desired degree the thermostat 30 by the expansion of its elements actuates connection 31, closing the valve 22, the necessary degree to reduce the flow of fluid in the pipe 23, and thus prevents the temperature in compartment 13 from rising too high. However, in order that the efficiency of the motor 4 should not be affected by the movement of the valves 22, the circulation of the cooling fluid through the connections 14—15 is not reduced when the valve 22 is adjusted, for the reason that the by-pass valve 29 is opened to a degree equivalent to the closing of the valve 22, thus permitting a constant flow of fluid in the outgoing pipe 20 and the return pipe 24, regardless of whether this fluid is flowing through pipes 23 or 28 or both.

It will thus be seen that during periods of cool weather the vehicle compartments may be kept at a desired temperature above the outside cold by employing the warming fluid in the circulating system 11 and 12, and the temperature will be retained automatically at the desired point, which point may be predetermined by adjustment of the thermostat connections at 32, or during periods of hot weather the refrigeration apparatus 10 may be operated to keep the temperature of the compartment 13 below the exterior temperature the desired amount.

The employment of motor trucks is greatly increasing the facility with which vegetables and other food products are handled from the suburbs into the city markets, and different food products are best preserved at different temperatures, and by employing my constant temperature truck, the best possible results of preservation are attained at a nominal cost.

I claim:

In an automobile having a water cooled propelling engine and a food storage chamber, the combination of circulating coils in said chamber for controlling the temperature thereof and means for selectively admitting cold or hot water thereto, the means for admitting the hot water comprising a connection for leading the hot water to said coils from the water system of the engine before entering its cooling radiator and a connection from said coils for discharging the water into said radiator.

ROBERT D. HATCH.